UNITED STATES PATENT OFFICE.

IGNAZ ROSENBERG, OF BIEBRICH, GERMANY, ASSIGNOR TO KALLE & CO., OF SAME PLACE.

MIXED SUBSTANTIVE DYE.

SPECIFICATION forming part of Letters Patent No. 588,182, dated August 17, 1897.

Application filed July 29, 1896. Serial No. 600,981. (Specimens.) Patented in England May 7, 1895, No. 9,103, and in France May 22, 1895, No. 247,626.

*To all whom it may concern:*

Be it known that I, IGNAZ ROSENBERG, residing at Biebrich-on-the-Rhine, in the Empire of Germany, have invented a new and useful improvement in the manufacture of mixed substantive tetrazo coloring-matters from diamins, 1.3 naphthylene mono or di sulfoacids and amins, phenols, or sulfo or carbo acids thereof, (for which Letters Patent have been obtained as follows: In England, No. 9,103, dated May 7, 1895, and in France, No. 247,626, dated May 22, 1895,) of which the following is an exact description.

By employing the 1.3 naphthylenediamin mono or di sulfo-acids which are described in the simultaneous application, Serial No. 600,978, filed July 29, 1896, and which are characterized by having two amido groups in meta or 1.3 position, I have succeeded in producing a new class of mixed substantive dyestuffs which are of great value in the arts. All these dyestuffs have the important property to dye unmordanted cotton. They are extremely fast to light, washing, and alkalies. They can be rediazotized on the fiber, and deeper shades can be developed by treatment with solutions of certain amins or of phenols suitable for such combinations. They can also be rediazotized in solution and combined with suitable amins or phenols.

For the production of the new coloring-matters which are the subject-matter of this application I combine molecular proportions of any of the well-known tetrazo bodies which are usually employed for the manufacture of substantive dyestuffs with molecular proportions of an amin or phenol or a sulfo or carbo acid thereof, and react with the so-contained intermediate bodies on molecular proportions of a 1.3 naphthylenediamin mono or di sulfoacid. The tetrazo body employed can of course be combined, first, with the 1.3 naphthylenediamin sulfo compounds and then with the other molecular proportion of an amin or phenol or sulfo or carbo derivatives thereof; but it is much more difficult to obtain homogeneous colors in this way than in that before mentioned. The molecular proportion of an amin or phenol or sulfo or carbo acid thereof in combinations given above for the production of mixed tetrazo dyestuffs may be replaced by a molecular proportion of a monoazo dyestuff, which is capable of combining again with a diazo body. The shades of these mixed substantive dyestuffs vary from yellowish red to blue and blue-black.

For example, the dyestuffs from naphthionic acid or 1.7 naphthylamin-sulfo-acid with benzidin and 1.3.6 naphthylenediamin-monosulfo-acid are bluish red. The dyestuff from salicylic-acid benzidin and 1.3.6 naphthylenediamin-monosulfo-acid dyes a yellowish red on cotton. If in this example the salicylic acid is replaced by oxytoluic acid, a brown is obtained. With beta-naphthylamin-sulfoacid Brönner a red, with 2.8.6 amidonaphthol-monosulfo-acid (G) or 1.8.3.6 amidonaphthol-disulfo-acid (H) or 1.8.4.6 amidonaphthol-disulfo-acid (K) violet-blue dyes are obtained. If tolidin is employed instead of benzidin, the shades are only slightly altered, whereas dianisidin gives bluer shades. Blue-black to deep greenish black substantive dyestuffs are obtained if the monoazo colors formed by combining diazotized paranitranilin or diazotized dehydrothio-paratoluidin-sulfo-acid with 1.8.3.6 amidonaphthol-disulfo-acid (H) or 1.8.4.6 amidonaphthol-disulfo-acid (K) in acid solution are combined with a molecular proportion of tetrazotized benzidin in presence of an excess of soda, and if the so-formed intermediate bodies are further combined with a molecular proportion of 1.3.6 naphthylenediamin-monosulfo-acid.

In carrying out my invention practically I proceed as follows:

Example I: The intermediate body formed in the well-known manner from 9.2 kilos of benzidin and seven kilos of salicylic acid in the presence of soda is mixed with an alkaline solution of thirteen kilos of 1.3 naphthylenediamin-monosulfo-acid. The resulting color is salted out, filtered, pressed, and dried. After drying and grinding it represents a red powder easily soluble in hot water, insoluble in alcohol, soluble in concentrated sulfuric acid with violet coloration, and giving on alkaline reduction with zinc-dust a colorless solution which turns brown under the influence of the air. It dies a yellowish red on unmordanted cotton and gives when rediazotized and combined with metaphenylene or metatoluylenediamin brown cotton colors of great intensity and fastness.

Example II: The azo color produced by combining in acid solution the diazo body made from fourteen kilos of paranitranilin with thirty-two kilos of 1.8.4.6 amidonaphthol-disulfo-acid (K) is combined with the tetrazo body produced from 18.4 kilos of benzidin in presence of an excess of soda. The formation of the intermediate body, which partly separates from the solution, is soon finished. A neutral solution of twenty-five kilos of 1.3.6 naphthylenediamin-monosulfo-acid is then added. After some hours' stirring the precipitate dissolves again in the liquid, which is then heated up. The formed dyestuff is salted out, filtered, pressed, and dried. After drying and grinding it forms a black bronzy powder, easily soluble in hot water, insoluble in alcohol, soluble in concentrated sulfuric acid with blue coloration. When boiled with zinc-dust, it is slowly reduced to a colorless or slightly-yellow solution, which turns brown when exposed to the air. It dyes unmordanted cotton in alkaline-salt bath a deep greenish black. On the fiber the dyestuff may be rediazotized and changed into still deeper shades by combination with suitable amins or phenols.

Instead of the benzidin given in the above examples molecular proportions of any of the known diamins employed in the manufacture of substantive dyestuffs may be used, and for the 1.3.6 naphthylenediamin-monosulfo-acid any other 1.3 naphthylendiamin mono or di sulfo-acid may be substituted in molecular proportion. Finally, instead of salicylic acid in Example I or of the paranitro-benzin-azo (K) acid in Example II any other amin or phenol or sulfo or carboxylic acid thereof or any other monoazo color capable of combining with a diazo body may be taken. When therefore in this application I refer to these specific bodies I mean thereby to include also all of their equivalents—namely, compounds of a similar nature. The dyestuffs obtained by any such substitution are all intended to be included in the present invention.

Now what I claim is—

1. The process of producing new mixed substantive dyestuffs by combining equimolecular proportions of a tetrazo body with 1.3 naphthylenediamin-sulfo-acids and an amin, substantially as described.

2. The process of producing new mixed substantive dyestuffs by combining equimolecular proportions of a tetrazo body with 1.3 naphthylenediamin-sulfo-acids and a monoazo dyestuff capable of combining with a diazo body substantially as described.

3. The process of producing the specific mixed substantive dyestuffs having the formula:

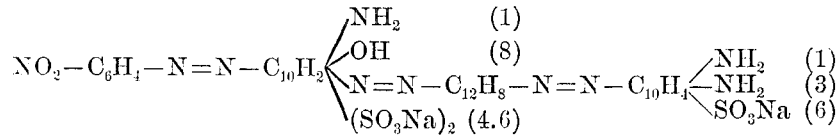

by combining equimolecular proportions of tetrazotized benzidin of the azo dyestuff formed from paranitro-diazo-benzene and 1.8.4.6 amidonaphthol-disulfo-acid (K) in acid solution, and of 1.3.6 naphthylenediamin-monosulfo-acid substantially as described.

4. A new mixed substantive dyestuff derivable from 1.3 naphthylenediamin mono or di sulfo-acids, which after drying and grinding represent red powders, easily soluble in hot water, insoluble in alcohol, soluble in concentrated sulfuric acid with violet coloration, and giving on alkaline reduction with zinc-dust colorless solutions which turn brown under the influence of the air, dyeing yellowish-red on unmordanted cotton, and which give when rediazotized and combined with metaphenylene or metatoluylene diamin brown cotton colors of great intensity and fastness, substantially as described.

5. The new substantive dyestuff having the formula:

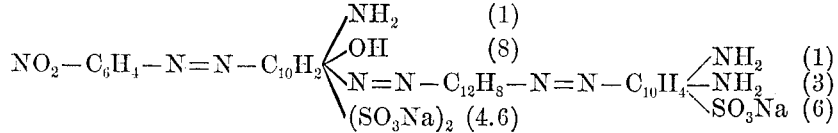

which dyestuff is producible by combining equimolecular proportions of tetrazotized benzidin, of the monoazo color formed by combining paranitro-diazo-benzene with 1.8.4.6 amidonaphthol-disulfo-acid (K) in acid solution and of 1.3.6 naphthylenediamin-monosulfo-acid, and which after drying and grinding forms a black bronze powder easily soluble in hot water, insoluble in alcohol, soluble in concentrated sulfuric acid with blue coloration, giving on alkaline reduction with zinc-dust a slightly yellow solution, which turns brown when exposed to the air, dyeing unmordanted cotton a deep greenish black, which on treatment with nitrous acid and combination in alkaline solution with beta-naphthol changes into a still deeper shade, and having the qualities, substantially as described.

In testimony whereof I have signed my name to this specification in the presence of two subscribing witnesses.

IGNAZ ROSENBERG.

Witnesses:
FRIEDRICH KNECKE,
HEINRICH MISCHLER.